UNITED STATES PATENT OFFICE.

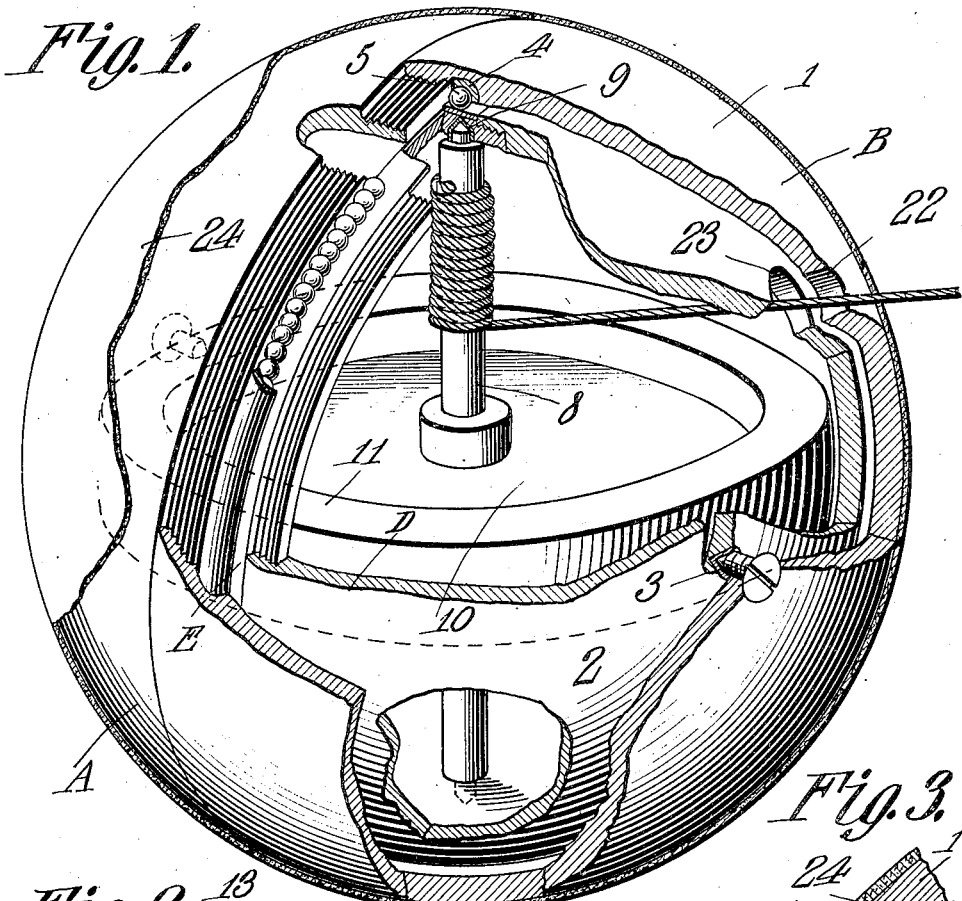
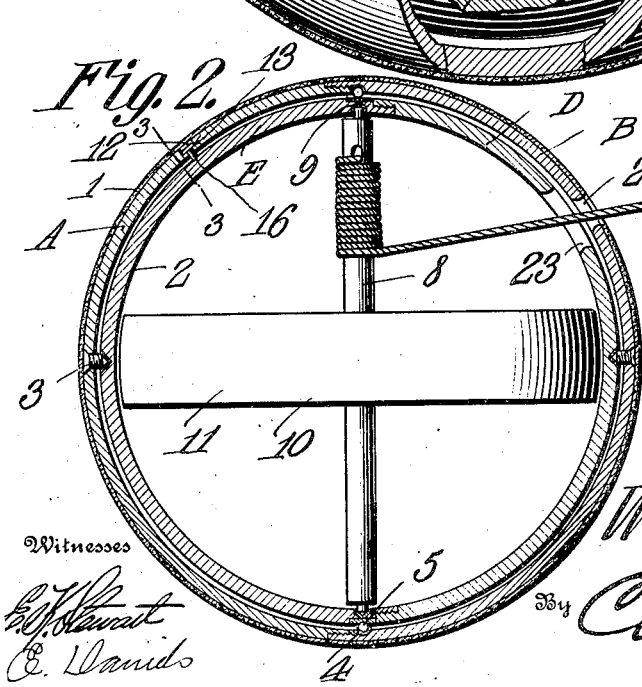
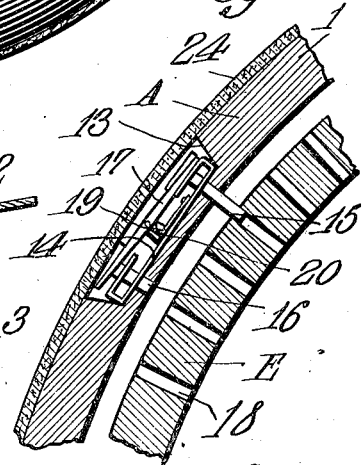

WILLIAM WORTH WRATHER, OF CHICAGO, ILLINOIS.

BALL.

942,952.

Specification of Letters Patent. Patented Dec. 14, 1909.

Application filed May 5, 1908. Serial No. 431,031.

*To all whom it may concern:*

Be it known that I, WILLIAM W. WRATHER, a citizen of the United States, residing at Chicago, in the county of Cook and State of Illinois, have invented a new and useful Ball, of which the following is a specification.

This invention relates to gyroscopic balls and has for its object to provide a ball especially designed for use by jugglers, acrobats and other aerial performers and which may also be used as a toy for children, and for other purposes.

A further object of the invention is to provide a ball which may be made to roll in any direction on a surface, or to roll in one direction only, or to remain perfectly still and resist all efforts made to move it either on a surface or on a stretched wire or cord, in the latter case without falling off. This object is accomplished by the use of two concentric spheres independently rotatable one within the other, and a wheel provided with a heavy rim mounted on a shaft journaled inside the inner sphere. A connecting means of any approved type is attached to the outer sphere by which the two spheres may be fastened together at will so as to revolve as one. A hole is formed through each sphere which, when brought into coincidence, offer a passage for the introduction of a means for rotating the wheel with great rapidity.

With this and other objects in view, the invention consists of the novel combination, construction and arrangement of parts hereinafter described and claimed, and illustrated in the accompanying drawing, in which—

Figure 1 is a perspective view of a gyroscopic ball constructed in accordance with my invention, portions thereof being broken away in order to more clearly show the interior construction of the same. Fig. 2 is a vertical sectional view of the same. Fig. 3 is a detail sectional view showing the manner of locking the inner sphere to the outer sphere the section being taken on the line 3—3 of Fig. 2.

Similar reference characters are used for the same parts in all the figures.

In the drawing, 1 indicates a hollow outer sphere preferably formed in two sections A and B, and 2 a concentric hollow inner sphere, also preferably formed in two sections E and D, the inner sphere being separated from the interior surface of the outer sphere by a small space.

The spheres 1 and 2 may be made of metal, composition or any material suitable for the purpose, diametrically pivoted together on pointed screws 3 threaded through the outer sphere 1 and seated in conical bearings in the inner sphere, as shown, or in any other desired or more efficient manner. A concave seat 4 is made in the inner surface of the outer sphere 1 in an equatorial line with respect to the axis of the pivot screws 3 to contain balls 5 which bear lightly against the outer surface of the inner sphere and relieve the pivot screws of the weight of said inner sphere. They also reduce friction to the minimum so that the spheres may revolve, relatively, to each other with great ease. Should the spheres be made of a composition having slight resistance to wear, the ball seats 4 and the ball track on the inner sphere may be made of steel.

It will be understood, of course, that the concave seat or ball-race is so shaped as to extend somewhat more than half-way around the balls, and thereby retain the same, the balls being dropped into the race-way through a radial opening in the sphere (not shown) which opening is subsequently closed by a suitable plug.

Within the inner sphere 2 is a shaft 8, its ends journaled in bearings 9 secured to the inner surface of said sphere and carrying a wheel 10 at its middle provided with a heavy rim or periphery 11. The axis of the shaft 8 is disposed at a right angle to the axis of the pivot screws 3 so that whatever relative position the spheres bear to each other, the plane passing peripherally through the center of the wheel perpendicular to the axis of its shaft will also pass through the common axis of the pivot screws 3. To fasten the two spheres together that they may act as one, a locking device 12 is employed which may resemble that shown for example in Fig. 2, and more clearly in Fig. 3, or be of any other construction desired. In the locking device shown, a small elongated slot or recess 13 is made in the exterior surface of the sphere 1, partly through its wall, in any convenient position, in which slot is placed a frame 14 provided at one end with a locking pin 15, and at the other end with a disengaging pin 16, each pin having an enlarged head.

Midway between the pins is fulcrumed a lever 17, the ends of which engage with the pins 15 and 16, so that when one is depressed the other will be raised. The pin 15 extends through the wall of the sphere 1 and is long enough, when depressed to enter any one of a series of depressions or openings 18 in the outer surface of the inner sphere 2. The pin 16 may, or may not, pass through the outer sphere as its sole object is to disengage the pin 15 from the inner sphere. To hold the pins 15 and 16 in their set position, an arm 19 may project inwardly from the lever 17 and engage with a spring 20 having a rib thereon to hold the end of the arm 19 fixed on one side or the other when operated by depressing the pins and shifting the lever 17.

Apertures 22 and 23 are made in the respective spheres 1 and 2 through which, when they are brought into coincidence a string or other means may be passed for rapidly rotating the axle and wheel. The ball may be covered with leather, rubber or other flexible material 24, which overlies the recess 13 and thus hides the locking device by means of which the peculiar actions of the ball are controlled, it being here stated that by reason of the yieldable nature of the covering 24, the pins 15 and 16 may be readily actuated by pressing inwardly on said covering at the recess 12.

A ball thus constructed can be made to perform many seemingly wonderful actions when the wheel is placed in rapid rotation. For instance, if the ball be placed with the axis of the pivot screws 3 in a horizontal position and the lock 12 disconnected, the ball may be rolled with the greatest ease and in a perfectly straight line in a direction perpendicular to said axis, but cannot be made to roll in a direction at an angle thereto. If the spheres are locked together, the ball cannot be made to roll or turn in any direction other than in the plane of rotation of the wheel 10, but remains perfectly still, resisting all reasonable efforts to revolve it. With the spheres locked, the ball may be placed on a stretched wire or rope where it will remain perfectly still or roll thereon, depending on the position of the revolving wheel with respect to the direction of the wire or rope.

Other novel and amusing things may be performed with a ball of this type without the cause therefor being understood by an audience.

It will be understood that the spheres are to be made in pieces and joined in some easily separable manner, as for instance each sphere may be divided into hemispheres screwed together. Attention is also called to the fact that the wheel may be rotated in a number of ways depending on the size of the ball. A string is represented in Fig. 2 to illustrate one means for rotating the wheel which string may be wound around the spindle 8 by first separating the sections of the inner and outer spheres and then passing the free end of the string through the openings 23 and 24, as will be readily understood. If desired, however, a suitable motor may be positioned within the inner sphere and operatively connected with the spindle 8 for actuating the latter, without departing from the spirit of the invention.

What is claimed is:—

1. A ball comprising nested concentric independently movable spheres, and a wheel rotatably mounted within the inner sphere.

2. A ball comprising nested concentric independently movable spheres, and a wheel adapted to rotate in a diametrical plane within the inner sphere.

3. A ball comprising nested concentric spheres spaced from each other, anti-friction bearings in said space, a wheel adapted to rotate in a diametrical plane within the inner sphere, and means for rotating said wheel.

4. A ball comprising two concentric spheres separated by a narrow space, anti-friction bearings within said space, pivot bearings between the two spheres, and a wheel adapted to rotate in a diametrical plane within the inner sphere.

5. A ball comprising two concentric spheres, separated by a narrow space and independently rotatable, pivot bearings between said spheres, and a wheel fixed on an axle adapted to rotate in a diametrical plane within the sphere.

6. A ball comprising two concentric spheres separated by a narrow space and independently rotatable, pivot bearings in a common axis between said spheres, a row of anti-friction bearings perpendicular to the common axis of the pivot bearings within the space between said spheres, and a wheel adapted to be rotated in a diametrical plane within the inner sphere perpendicular to the plane of the anti-friction bearings and to the axis of the pivot bearings.

7. A ball comprising nested concentric independently movable spheres, a wheel adapted to rotate in a diametrical plane within the inner sphere, and means for locking the spheres together.

8. A ball comprising two concentric independently movable spheres, a wheel adapted to rotate in a diametrical plane within the inner sphere, and locking means mounted in the outer sphere for fastening the two spheres together.

9. A ball comprising two concentric independently rotatable spheres, each having a hole through its shell, which can be brought into coincidence, a wheel fixed on an axle adapted to rotate in a diametrical plane within the inner sphere, and means capable of passing through said openings to rotate said wheel.

In testimony that I claim the foregoing as my own, I have hereto affixed my signature in the presence of two witnesses.

WILLIAM WORTH WRATHER.

Witnesses:
　DAVID HAYES,
　FRED ALBERT FOX.